United States Patent Office 3,843,328
Patented Oct. 22, 1974

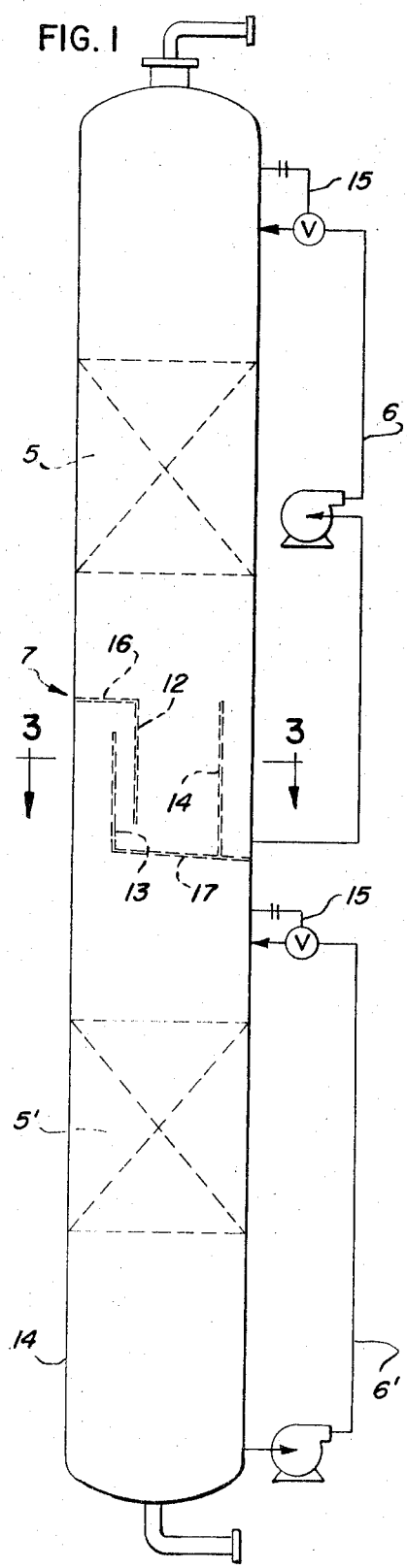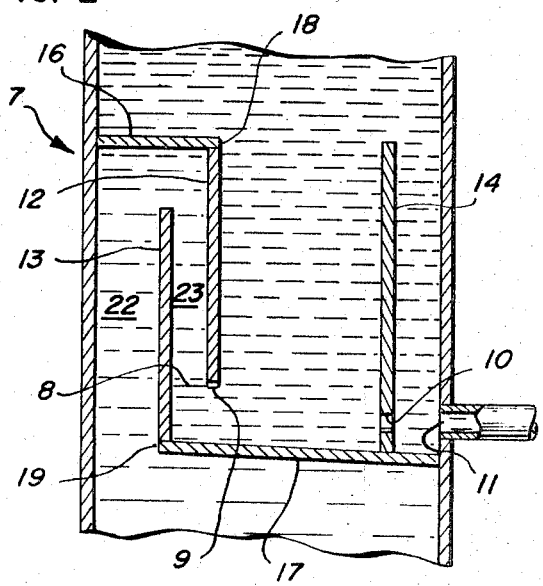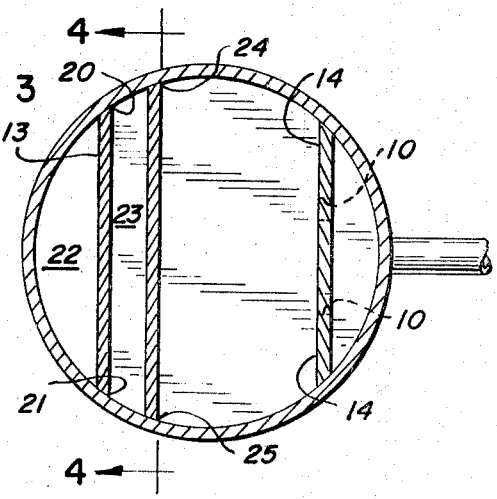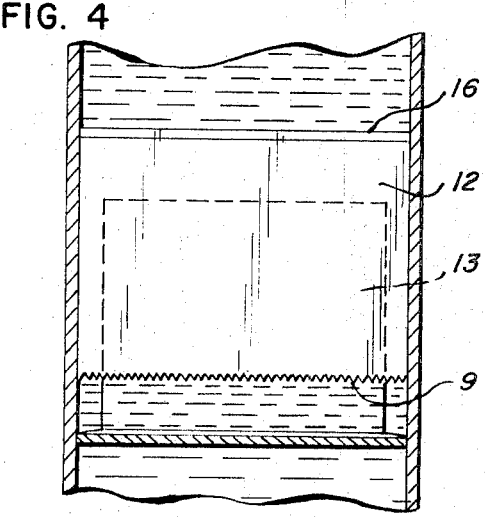

3,843,328
STAGE SEPARATOR FOR LIQUID-LIQUID MULTI-STAGED PACKED TOWER
Robert E. Bosanac, Wheaton, Ill., assignor to Standard Oil Company (Indiana), Chicago, Ill.
Filed Oct. 23, 1973, Ser. No. 408,569
Int. Cl. B01d 11/04
U.S. Cl. 23—270.5          3 Claims

ABSTRACT OF THE DISCLOSURE

In a mass transfer device of the liquid-liquid, countercurrent multistaged packed tower type, an improved upcomer conduit providing communication between packed bed zones having a saw-toothed liquid-liquid interface separator and baffled wash liquid outlet allows essentially complete isolation of wash liquid per stage.

BACKGROUND OF THE INVENTION

The field of this invention relates to an improved apparatus for countercurrent contacting of immiscible liquids. This invention relates to an improved upcomer which allows essentially complete isolation of the countercurrent wash-liquid for each stage or contacting zone within a single tower. This leads to greater efficiency of the extraction without the need of elaborate inter-stage piping or more than one extraction tower.

Continuous multi-staged liquid-liquid extraction is well known. In order to enhance liquid contact a sieve type packed bed and/or a series of perforated trays are employed. Generally, liquid extraction is effected by having one liquid phase flow in an upward direction through a tower containing the packed bed while the other liquid phase flows in a downward direction through the same tower. Further, it is recognized that for a given volume of wash liquid a series of small individual wash steps result in a more efficient extraction than a single large wash. Thus to optimize extraction efficiency a multi-stage process having a separate wash liquid per stage is preferred. However, previous to the present invention when extracting propylene with a countercurrent caustic wash either extensive internal piping or separate vessels were required to achieve this optimization.

SUMMARY OF THE INVENTION

I have discovered, in a liquid-liquid countercurrent tower comprising a plurality of contiguous contacting stages each of said stages comprising a fixed packed bed occupying a portion of a single vertical tower, the improvement between each of said stages comprising;

(a) a first horizontal baffle spanning a portion of the inner cross section of said tower having a portion of its outer perimeter in contact with the inner surface of said tower and the remainder forming a first internal ledge, (b) a first vertical planar baffle having a top edge in contact with said first internal ledge, two vertical outermost edges each in contact with inner surface of said tower and a horizontal bottom edge terminating in a means to distribute the upcoming liquid across the entire edge, (c) a second substantially horizontal baffle, displaced below the edge containing distributing means of said first vertical planar baffle, spanning a portion of the inner cross section of said tower having a portion of its outer perimeter in contact with the inner surface of said tower such that the remainder of the perimeter forms a second internal ledge entirely below said first horizontal baffle, (d) a second vertical planar baffle having a bottom edge in contact with said second internal ledge, two vertical outermost edges each in contact with the inner surface of said tower and a horizontal top edge terminating above said edge containing distributing means of said first vertical planar baffle and below said first horizontal baffle, and (e) a third vertical planar baffle having a bottom edge in contact with said second horizontal baffle in such a manner that it is not under any portion of said first horizontal baffle, two vertical outermost edges each in contact with the inner surface of said Tower and a horizontal top edge terminating at about the level of said first horizontal baffle wherein said third vertical planar baffle has at least one passageway near said bottom edge to allow passage of liquid.

One object of this invention is to have a single liquid-liquid countercurrent contacting tower with high extraction efficiency. A second object is to accomplish this efficiency with a minimum of internal piping and structure. A third object is to have this extraction efficiency at least equivalent to that characteristic of the use of multiple vessels wherein the countercurrent wash liquid is isolated on a per vessel basis. A related fourth object is to accomplish the second and third object by having multiple stages or zones within a single tower of object one separated by a simple structure that allows isolation of the countercurrent wash liquid on a per stage or zone basis. Another object is to have each stage or zone contain a fixed bed for improved liquid-liquid contact. Still another object is to have a single tower with two fixed bed stages separated by a single upcomer structure for caustic extraction of propylene and high efficiency. Other objects of this invention will be apparent to one skilled in the art upon complete reading of the specification and example.

BRIEF DESCRIPTION OF THE DRAWINGS

FIG. 1 of the drawings is a cut-away side view of the preferred specific embodiment, a two-stage packed tower. It shows the overall relationship of improved upcomer 7, dashed circle, with respect to the two fixed bed stages 5 and 5' with independent wash-liquid circulation 6 and 6'.

FIG. 2 is an enlarged cut-away side-view of the improved upcomer 7 showing details of preferred embodiment including the liquid-liquid interface 8 located at the level of the saw-tooth edge 9 with passageway 10 and outlet 11 below this level.

FIG. 3 is a horizontal plane view of the cross section of the upcomer taken through sections 3—3 of FIG. 1 and FIG. 2. It reveals the relative position of the first 12, second 13, and third 14 vertical planar baffles.

FIG. 4 is a vertical plane view of the first 12 vertical planar baffle showing the saw-tooth edge 9 taken through section 4—4 of FIG. 3.

DESCRIPTION OF THE PREFERRED EMBODIMENTS

The preferred specific embodiment, as illustrated in the drawing, involves a cylindrical liquid-liquid countercurrent tower 14 of FIG. 1. This tower can be made from any convenient metal or other structural material as well known in the art. In other embodiments the geometry and shape can be varied to suit the particular extraction process.

The tower 14 contains two stages or zones separated by upcomer 7, dotted circle. Each stage contains a fixed packed bed 5 and 5', an isolated recycle wash liquid system 6 and 6', and individual wash liquid level controls 15 and 15'. In other embodiments the tower may have more than two zones with additional upcomers between each zone. Two zones each having packed beds of two-inch polypropylene intalox saddles from 10 to 15 feet in length and an upcomer of at least 3 feet in length is operative for the preferred caustic wash of propylene.

The upcomer 7 as illustrated in FIG. 1 and enlarged in FIG. 2 and FIG. 3 consists of two essentially horizontal baffles 16 and 17 and three vertical planar baffle 12, 13 and 14. Both the upper horizontal baffle 16, see FIG. 4, and the lower horizontal baffle 17, not shown, are attached to the inner surface of the tower (or fluid conduit) forming a pair of internal ledges impervious to the flow of liquid. Each ledge extends inwardly to such an extent that their outer edges 18 and 19 overlap. The lower surface 17 is sloped in this preferred specific embodiment such that the wash liquid will tend to flow from the outer edge 19 towards the outlet 11. In other embodiments both or neither horizontal baffles may be sloped. A drop of 3 inches per 11 feet is usually sufficient, thus the term "substantially horizontal surface" is used.

Two of the three vertical baffles 13 and 14 are attached to the lower substantially horizontal baffle 17 and extend upward toward the plane of horizontal baffle 16. Vertical baffle 13 is attached to the innermost edge 19 of baffle 17 as well as being attached to the inner baffle of the tower at 20 and 21 of FIG. 3. This baffle terminates below the upper horizontal baffle, thus forcing the upcoming liquid to pass up through channel 22 and down channel 23 of FIG. 2 and FIG. 3. Vertical baffle 14 is attached to substantially horizontal baffle 17 and the inner baffle of the conduit terminating at a height near the plane of horizontal baffle 16. This vertical baffle 14 is positioned between vertical baffle 13 and outlet 11 such that it acts as a baffle preventing short circuiting of the upcoming liquid through the wash recycle circuit 6. A small drain hole 10 is provided to allow some recycle of wash liquid confined between vertical baffles 13 and 14. For caustic wash of propylene two ¼-inch diameter drain holes are sufficient.

The other vertical baffle 12 is attached to the upper horizontal baffle 16 along its innermost edge 18 extending downward between the previous vertical baffles 13 and 14 terminating below the upper edge of vertical baffle 13 and above the substantially horizontal baffle 17. The outer vertical edges of vertical baffle 12 are attached to the inner surface of the towers 24 and 25 of FIG. 3, thus limiting the upcoming liquid to circulate down channel 23 and under the lower edge of vertical baffle 12 which establishes the liquid-liquid phase interface.

The lower edge of vertical baffle 12 terminates in a means to distribute the upcoming liquid across the entire edge 9. In the illustrated preferred specific embodiment this liquid distributing means is a saw-toothed pattern 9 of FIG. 4. For caustic wash of propylene the pattern involves teeth of from ¾ to 2½ inches in length. In other specific embodiments the distributing means can be any convenient repeating pattern involving a variation in height of the opening such as semicircles, segments of transcendental functions, square wave, series of holes and the like. During continuous operation the liquid-liquid phase interface is maintained at the level of this distributing means by virtue of the less dense upcoming fluid being trapped in the upcomer. The rate of recycle through 6 and 6' is determined by what superficial velocity is desired for the continuous phase based on the designed extraction volumes and contact times. In practice the desired extraction is achieved monitoring the wash liquid level at 15 and 15' and controlling the flow rate in 6 and 6'. Although not shown, a wash purification step is usually included in the recycle systems 6 and 6'. For the preferred embodiment a caustic regenerator is employed.

Having described the invention, the following example is presented to illustrate the preferred embodiment but should not be considered unduly limiting.

EXAMPLE

In a 52 foot long, 7 foot diameter, two-stage tower, as illustrated in FIG. 1 of the drawings, containing two 12 foot packed beds of two-inch polypropylene intalox saddles divided by a single 6 foot upcomer, liquid propylene was washed with liquid caustic, 10% sodium hydroxide and water at 432–450 p.s.i. and 100° F., in a continuous manner with an overall space velocity of 1.0 ft. per minute. In this manner the concentration of mercaptan in the propylene was reduced to less than 0.5 p.p.m. The recovered propylene from this one step caustic wash was of sufficient purity to be considered a polymerization grade product.

I claim:
1. In a liquid-liquid countercurrent tower comprising a plurality of contiguous contacting stages, each of said stages comprising a fixed packed bed occupying a portion of a single vertical tower, the improvement within said tower between each of said stages comprising;
   (a) a first horizontal baffle spanning a portion of the inner cross section of said tower having a portion of its outer perimeter in contact with the inner surface of said tower and the remainder of said perimeter forming a first internal edge,
   (b) a first vertical planar baffle having a top edge in contact with said first internal edge, two vertical outermost edges each in contact with inner surface of said tower and a horizontal bottom edge terminating in a saw-toothed edge to distribute the upcoming liquid across the entire edge,
   (c) a second substantially horizontal baffle displaced below the edge containing distributing means of said first vertical planar baffle, spanning a portion of the inner cross section of said tower having a portion of its outer perimeter in contact with the inner surface of said tower such that the remainder of its perimeter forms a second internal edge entirely below said first horizontal baffle surface,
   (d) a second vertical planar baffle having a bottom edge in contact with said second internal edge, two vertical outermost edges each in contact with the inner surface of said tower and a horizontal top edge terminating above said edge containing distributing means of said first vertical baffle and below said first horizontal baffle,
   (e) a third vertical planar baffle having a bottom edge in contact with said second horizontal baffle in such a manner that it is not under any portion of said first horizontal baffle, two vertical outermost edges each in contact with the inner surface of said tower and a horizontal top edge terminating at about the level of said first horizontal baffle wherein said third vertical baffle has at least one passageway near said bottom edge to allow passage of liquid,
   (f) an outlet, in the tower for removal of liquid located slightly above the second horizontal baffle between the outermost edges of said third vertical baffle on the side opposite to that of the first and second vertical baffles, and
   (g) said second substantially horizontal planar baffle being sloped to allow liquid to flow from the inner side of the third vertical surface through the passageway and out the outlet.
2. A device of Claim 1 wherein there are two stages.
3. A device of Claim 2 wherein the vertical tower is a cylindrical tower with hemispherical ends of about 40 to 80 feet in length and 6 to 10 feet in diameter with packed bed stages of from 10 to 30 feet in length and wherein vertical baffles are 3 to 15 feet in length and said saw-toothed edge having teeth of from about ¾ to 2½ inches in length.

References Cited

UNITED STATES PATENTS

| | | | |
|---|---|---|---|
| 2,713,023 | 7/1955 | Irvine | 202—158 |
| 2,646,392 | 7/1953 | Gerhold | 202—158 |
| 2,678,199 | 5/1954 | Koch | 202—158 |
| 2,791,537 | 5/1957 | Felix | 196—14.52 |
| 2,451,433 | 10/1948 | Davis | 23—270.5 |
| 3,412,016 | 11/1968 | Graven | 203—98 |
| 3,749,647 | 7/1973 | Micklewright | 203—153 |

NORMAN YODKOFF, Primary Examiner

S. J. EMERY, Assistant Examiner

U.S. Cl. X.R.

196—14.52; 202—158; 55—340; 261—110